US012702090B2

(12) United States Patent
Seaman

(10) Patent No.: US 12,702,090 B2
(45) Date of Patent: Aug. 11, 2026

(54) PRECONDITIONER NOZZLE MOUNT FOR SWATHER

(71) Applicant: Paul A. Seaman, Twin Falls, ID (US)

(72) Inventor: Paul A. Seaman, Twin Falls, ID (US)

( * ) Notice: Subject to any disclaimer, the term of this patent is extended or adjusted under 35 U.S.C. 154(b) by 920 days.

(21) Appl. No.: 17/891,815

(22) Filed: Aug. 19, 2022

(65) Prior Publication Data

US 2023/0054177 A1 Feb. 23, 2023

Related U.S. Application Data

(60) Provisional application No. 63/235,106, filed on Aug. 19, 2021.

(51) Int. Cl.

*A01D 43/14* (2006.01)
*B05B 15/16* (2018.01)
*B05B 15/652* (2018.01)
*A01D 43/10* (2006.01)

(52) U.S. Cl.

CPC .............. *A01D 43/14* (2013.01); *B05B 15/16* (2018.02); *B05B 15/652* (2018.02); *A01D 43/10* (2013.01)

(58) Field of Classification Search

CPC ........ A01D 43/14; A01D 34/66; A01D 43/10; B05B 15/652; B05B 15/16

See application file for complete search history.

(56) References Cited

U.S. PATENT DOCUMENTS 4,936,082 A * 6/1990 Majkrzak ............... A01D 57/10 56/220
5,033,495 A * 7/1991 Monauni ............... F16K 17/383 251/144
5,772,927 A * 6/1998 Koizumi ................ F02M 19/04 261/DIG. 38
D913,453 S * 3/2021 Morgan ........................ D23/259
2005/0040674 A1* 2/2005 Vanlterson ................ B60S 1/52 296/192
2016/0169179 A1* 6/2016 Noguchi .............. F02M 61/162 239/518
2016/0176243 A1* 6/2016 Lin ....................... B60C 23/135 152/429
2022/0322605 A1* 10/2022 Ritchey .............. A01D 41/1243

FOREIGN PATENT DOCUMENTS

EP 2135798 A1 * 12/2009 ........... B60K 15/063

OTHER PUBLICATIONS

Dohrmann clarification (Year: 2010).*
Dorhmnann Applicators brochure, Dorhmann Enterprises, Inc., 12 pages, Waite Park, MN (Jan. 1, 2010).

* cited by examiner

*Primary Examiner* — Joseph M Rocca
*Assistant Examiner* — Douglas J Meislahn
(74) *Attorney, Agent, or Firm* — Burdick Patents, P.A.; Sean D. Burdick; Colin L. Honan

(57) ABSTRACT

A nozzle mount for a swather includes a mounting plate configured for attachment to the swather, a nozzle head extending from one side of the mounting plate, and a nozzle shield attached to the mounting plate and configured to at least partially enclose the nozzle head to protect the nozzle head from impact damage while allowing the nozzle head to direct preconditioner fluid flow into the swather. The nozzle head is configured for attachment to a fluid source, such as a hay preservative, that can be sourced from a locally mounted tank.

18 Claims, 12 Drawing Sheets

PRECONDITIONER NOZZLE MOUNT FOR SWATHER

RELATED APPLICATIONS

This application claims priority to U.S. Provisional Application 63/235,106 that was filed on Aug. 19, 2021 and which is fully incorporated herein by reference.

BACKGROUND OF THE INVENTION

Field of the Invention

The present invention relates generally to harvesting machinery, and more specifically to a swather modified for injection of liquid preservative into a crop being harvested.

Description of Related Art

Swathers, also known as windrowers, are mechanized farm machinery used for cutting hay and other grain crops. Swathers are powered by an engine or a power take-off device on a tractor that is mechanically coupled to rotating blades such as a rotary discs or a sickle bar. The blades are mounted within a header or grain platform. As the header is driven into rows of uncut crop, it directs stems of the uncut crop into the blades of the header, which cut the stems into smaller sections. A swather may also include a conditioner located behind the blades. The conditioner is typically constructed as a series of offset horizontal rollers or gears that further process the cut stems by bending and crimping them. The cut and conditioned crop is ejected from the header to the ground to lay in a mown strip called a swathe. In that condition the swathe may be left to dry for a period of time until lit can be further processed, for example by a hay baler or other harvesting implement.

Drying time for the swathe is a critical consideration during the harvest. For example, a crop such as hay that is baled when its moisture content is too high has a higher risk of spoilage due to microbial metabolism. When the moisture content of the hay is too low when baled, it loses nutritional value and becomes more susceptible to damage from rain. To minimize these risks and optimize the value and storage life of hay and other grain crops, farmers often add preservatives to the cut hay, such as bacterial inoculants or propionic acid-based solutions. Bacterial inoculants are known to improve silage fermentation and reduce spoilage in most hay, while propionic acids when properly applied can be effective in inhibiting mold, yeast, and bacterial growth.

Specialized applicators have been developed by companies such as Dohrmann Enterprises, Inc. to allow farmers to apply preservatives to hay to prepare the hay for baling. The applicator typically consists of a tank for containing the preservative in liquid form, and a spray nozzle that draws preservative from the tank through a hose. Using the applicator, the farmer can inoculate the hay prior to baling by spraying down the swathe. Manual delivery of the preservative, however, tends to distribute the preservative unevenly to the hay, and without penetrating the outer layers of the swathe. Some attempts have been made to automate inoculation by rigging an applicator to a hay baler and directing a continuous spray into the baler as it picks up the swathe. This technique tends to waste a substantial amount of the preservative onto the ground, and in any event, when using the baler as the delivery platform, application of the preservative arrives too late to optimize its desirable effects on the swathe.

What is needed is an improved scheme for automatic application of liquid preservative to harvested hay.

SUMMARY OF THE INVENTION

The present invention presents exemplary embodiments for a preconditioner nozzle mount for a swather, and for a swather header configured with a preconditioner nozzle mount. A specialized installation tool for use with the preconditioner nozzle mount is also disclosed.

In one embodiment of the invention, a nozzle mount for a swather includes a mounting plate configured for attachment to the swather, a nozzle head extending from one side of the mounting plate, the nozzle head configured for attachment to a fluid source, and a nozzle shield attached to the mounting plate and configured to at least partially enclose the nozzle head to protect the nozzle head from impact damage while allowing the nozzle head to direct fluid flow rearward into the swather from a position forward of swather cutting blades and conditioner, i.e. from a preconditioner position. In preferred embodiments, the nozzle head is in fluid communication with a fluid coupler that connects to a fluid source. The fluid coupler may have two ends: a flanged end with means to sealingly engage the mounting plate, and an opposite barbed end for connection to a fluid source. The barbed end may receive a conventional tube or hose for connecting to the fluid source. The nozzle head may also comprise a threaded nut, enclosed within the nozzle shield, to provide for easy and convenient adjustment of the nozzle head direction. The nozzle shield may be formed as an integral extension of the mounting plate or may be a separate piece securely connected to the mounting plate.

Another embodiment of the invention provides a swather header that includes a hood, cutting blades mounted beneath the hood, a conditioner having a crop receiving end mounted behind the cutting blades, and a preconditioner nozzle mount attached to the hood. The preconditioner nozzle mount has a nozzle head configured to direct a spray of fluid toward the receiving end of the conditioner. The swather header also includes means for operationally coupling the swather header to mechanical power for driving the cutting blades and the conditioner. The preconditioner nozzle mount includes means for connecting the nozzle head to a fluid source, such as a fluid coupler with a hose extending from the fluid source. The fluid coupler may be configured as an integral extension of the hood or may otherwise be secured thereto through conventional means, e.g., welding or through use of fasteners such as nuts and bolts. On an underside of the hood, the preconditioner nozzle mount has a nozzle shield configured to at least partially enclose the nozzle head. The nozzle shield may also be an integral extension of the hood or may otherwise be secured thereto through conventional means, e.g., welding or conventional fasteners. Preferably, the nozzle head includes means for adjusting the head, such as a threaded nut, to allow a user to optimize the direction of the spraying fluid.

Another embodiment of the invention provides a preconditioner nozzle mount kit. The kit includes a nozzle mount and an installation tool. The nozzle mount is configured for preconditioner attachment to a swather header, and includes a nozzle head. The installation tool has a socket having a hollow interior, an engagement end at one end of the socket configured for rotational engagement with the nozzle head, a driving end opposite the engagement end configured to allow unobstructed access to the engagement end through the hollow interior of the socket, and one or more wings extending outwardly from the driving end to allow a user to manually tighten or loosen the nozzle head while making fine adjustment to a direction of fluid spray exiting the nozzle head.

Another embodiment of the invention is limited to an installation tool for adjusting a shielded nozzle head. The installation tool includes a socket having a hollow interior, an engagement end at one end of the socket configured for rotational engagement with the nozzle head, a driving end opposite the engagement end configured to allow unobstructed access to the engagement end through the hollow interior of the socket, and one or more wings extending outwardly from the driving end. In another embodiment, a kit for converting a conventional swather consists of the preconditioner nozzle mount and the installation tool.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. Dimensions shown are exemplary only. In the drawings, like reference numerals may designate like parts throughout the different views, wherein:

DETAILED DESCRIPTION OF THE INVENTION

The following disclosure presents exemplary embodiments for a preconditioner nozzle mount for a swather, and for a swather header configured with a preconditioner nozzle mount. A specialized installation tool for use with the preconditioner nozzle mount is also disclosed.

Figure 1:
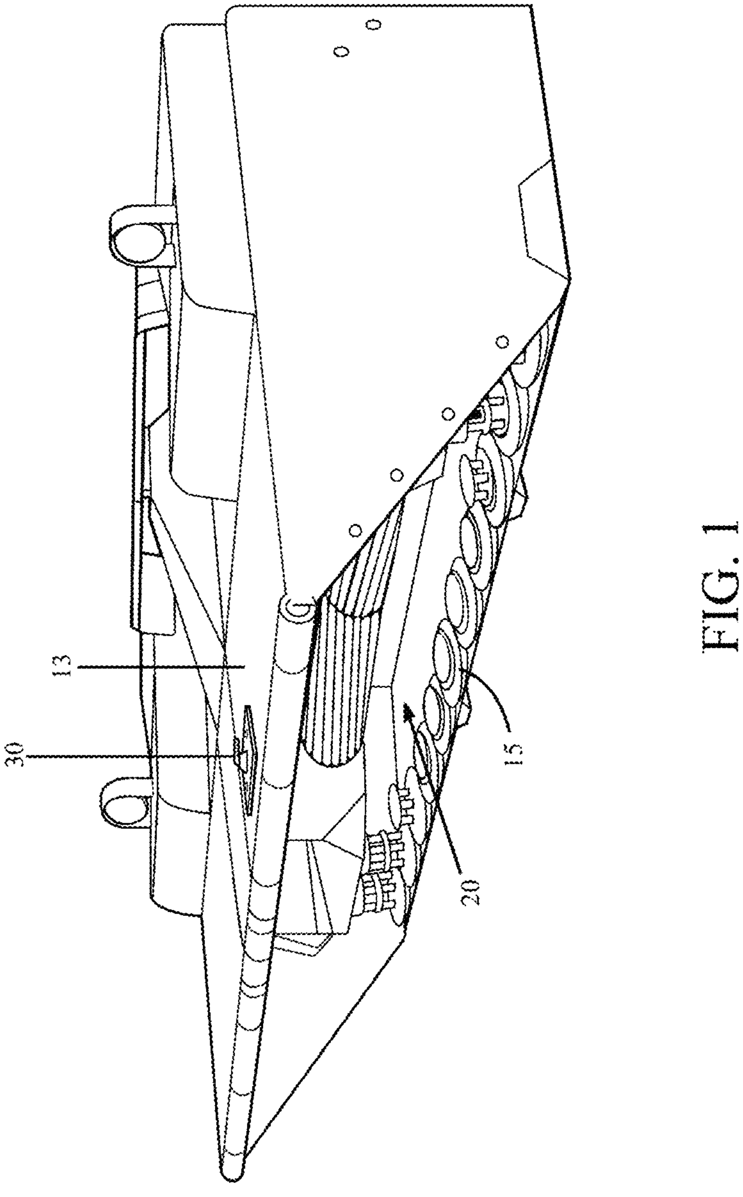
FIG. 1 is a perspective view of a conventional swather header modified according to the invention.

FIG. 1 shows a perspective view of a conventional swather header 10 modified according to the invention, which can be mounted to a tractor (not shown). The swather header 10, as in a conventional swather header, includes a hood 13 that is shaped and located to direct uncut grain or hay stalks into the swather header 10 and underneath the hood 13 as the header 10 is moved forward (i.e. toward the viewer) over rows of the uncut crop. An arrangement of blades 15 mounted underneath the hood 13 cut the grain or hay stalks as they are directed into the swather header 10. A conditioner 20 is mounted underneath the hood 13 and behind the blades 15.

The conventional swather header 10 is modified according to the invention by a nozzle mount 30 that is attached atop the hood 13. The nozzle mount 30 supports a spray nozzle (hidden in this view) that protrudes from underneath the hood 13 to direct a flow of liquid, such as a hay preservative or inoculant, from the front of the swather rearward to a crop being harvested by the swather header 10. The nozzle mount 30 may be located at any location atop the hood 13 to optimize coverage of the harvested crop by the spray nozzle, and more than one nozzle mount may be installed. The nozzle mount is also configured to protect the spray nozzle from mechanical damage, and accordingly, provides a means for mounting and protecting a spray nozzle that directs liquid spray into the swather header.

Figure 2:
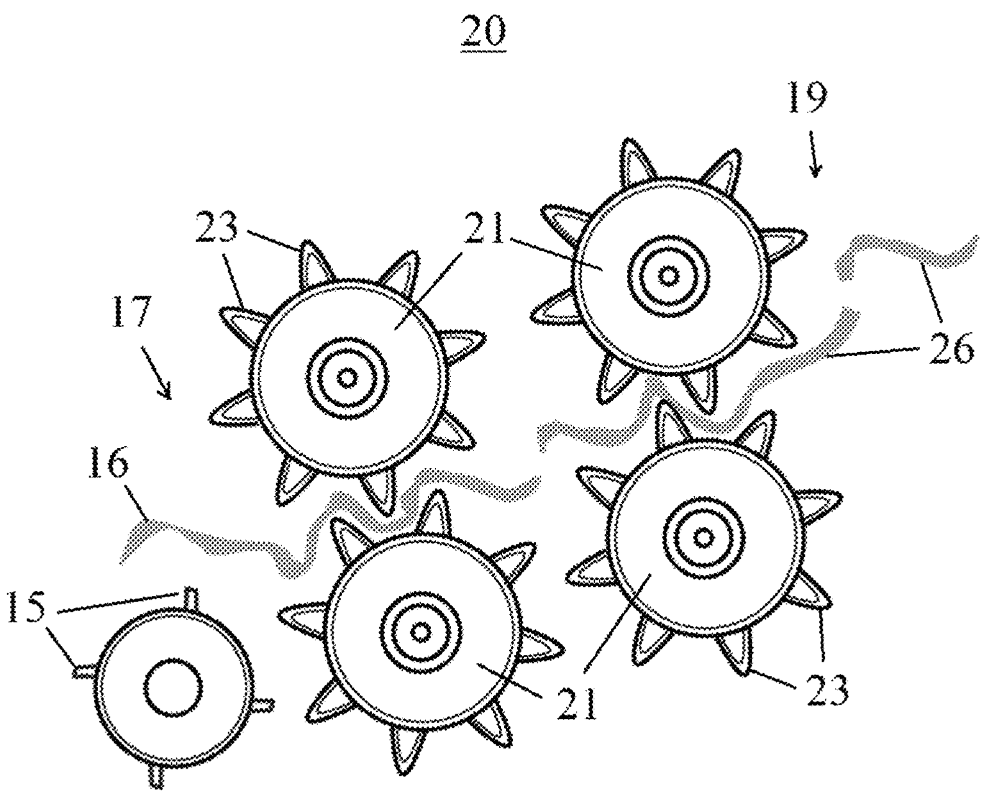
FIG. 2 is a diagram showing a side view of a conditioner, of conventional design, for installation within a swather header.

FIG. 2 is a diagrammatic view of a conditioner 20, of conventional design, for installation within a swather header 10. The conditioner 20 is located behind and adjacent to the blades 15, to receive freshly cut stalks 16 from the blades 15 as the swather header 10 moves forward. The conditioner 20 includes a series of horizontal rollers or gears 21 that are horizontally and vertically offset from one another, as shown. The gears 21 are coupled to a rotational motive force that causes each gear 21 to rotate in a direction opposite that of its paired counterpart. At a receiving end 17 of the conditioner 20, the counter-rotating action of each gear pair pulls the cut stalks 16 in between the gears 21, where gear teeth 23 condition the stalks 16 by bending and crimping them. At an ejection end 19 of the conditioner 20, the cut and conditioned stalks 26 are ejected from the swather header 10 to the ground where they lay as swathe.

Figure 3:
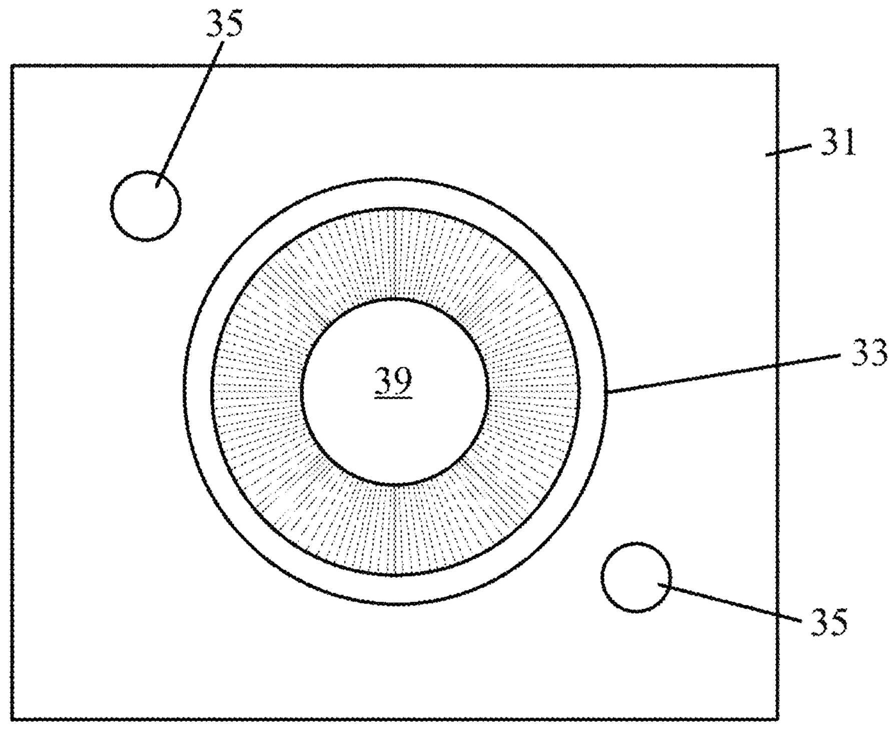
FIG. 3 is a bottom view of one embodiment according to the invention of a nozzle mount for a swather header.

FIG. 3 shows a bottom view of one embodiment according to the invention of a nozzle mount 30 for a swather header 10. Nozzle mount 30 includes a mounting plate 31 and a nozzle shield 33. One or more mounting holes 35 may be defined through the mounting plate 31 and sized for allowing passage therethrough of mounting hardware, such as a rivet or threaded bolt. Mounting plate 31 in this embodiment has a rectangular form, although it will be understood that other embodiments are possible in which the mounting plate 31 has other geometric shapes. However it is shaped, mounting plate 31 is configured to mount securely to a top surface of a hood 13 of a swather header 10. The nozzle shield 33 extends from the mounting plate 31 in a direction substantially perpendicular to the mounting plate 31. Preferably, the nozzle shield 33 has a length extending from the mounting plate sufficient to extend through the hood 13 of the swather header and protrude some distance below an underside of the hood. In other embodiments, the nozzle shield may be configured to fit flush with an underside of the hood.

The nozzle shield 33 in this embodiment has a generally cylindrical form, although other embodiments are possible in which the nozzle shield has other geometric shapes. Whatever its shape, the nozzle shield 33 is configured to at least partially enclose a nozzle head 51 to protect the nozzle head 51 from damage from impact along a path (in one embodiment) or along any path (in another embodiment) that is parallel to the plane of the mounting plate 31. A plumbing hole 39 is defined through the mounting plate 31, and may be placed substantially at the geometric center of the plate, as shown. Whatever the shape of plumbing hole 39, the plumbing hole 39 is located within the area of the mounting plate 31 that lies within the width or diameter of the nozzle shield 33. This configuration allows passage of a fluid-carrying conduit, tubing, pipe or pipe fitting through the mounting plate 31 into a volume that is protected by the nozzle shield 33.

In one embodiment, the mounting plate 31 and nozzle shield 33 are each made from a hard, rigid material such as carbon steel, though other materials such as various plastics, various synthetic rubbers, and other metals such as stainless steel and aluminum are possible in alternative embodiments of the invention. The nozzle shield 33 may be attached to the mounting plate 31 by any conventional means, e.g. by fasteners, by threaded connection, or by friction-fit. In the embodiment depicted here, the nozzle shield 33 and mounting plate 31 are made from carbon steel, and are welded together.

Figure 4:
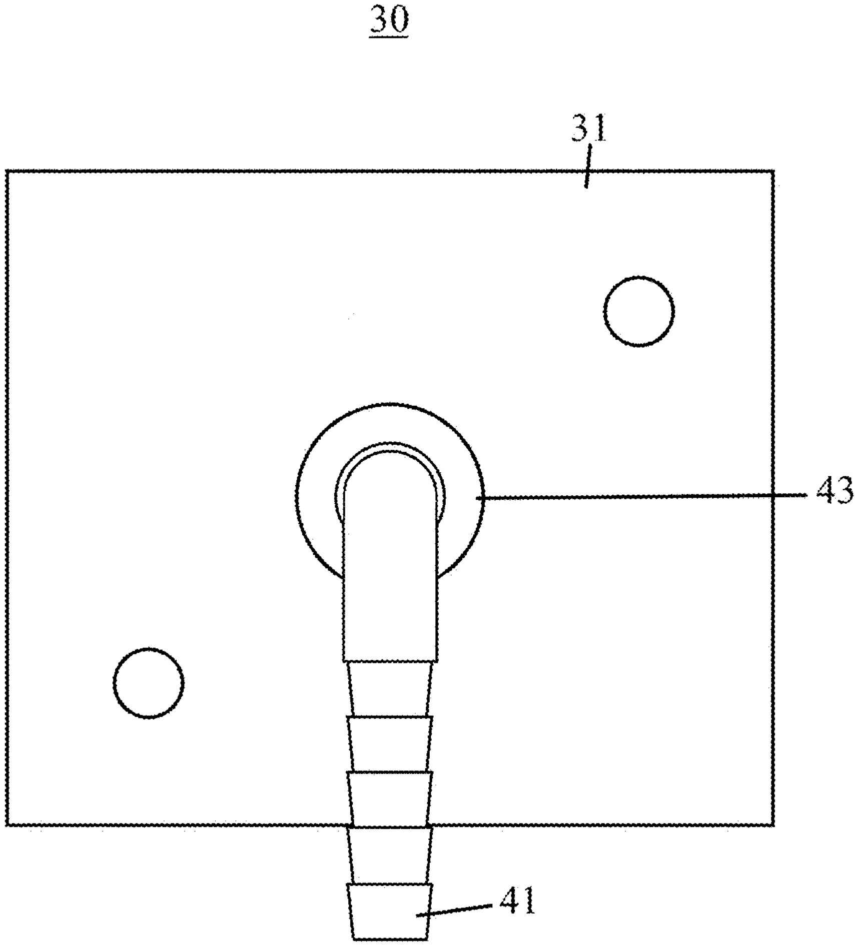
FIG. 4 is a top view of the nozzle mount of FIG. 3, with a hose barb installed thereon.

FIG. 4 shows a top view of the nozzle mount 30, with a fluid coupler 41 installed on the nozzle mount. The fluid coupler 41 is depicted as a hose barb. The fluid coupler 41 may be of conventional design, e.g. configured as a straight or angled hollow tube or conduit having a barbed outer surface at one end, and sized appropriately to sealably attach the barbed end to a hose or tubing that directs fluid to the nozzle mount 30. At its end opposite the barbed end, the fluid coupler 41 may be configured with a flanged end 43 to ensure a secure attachment to the mounting plate 31 in a manner that seals the plumbing hole 39. In the embodiment of FIG. 4, the sealing and attachment of the fluid coupler 41 to the mounting plate 31 may be accomplished by attaching the flanged end 43 to the top surface of the mounting plate 31 so that the flanged end 43 covers the plumbing hole 39 and aligns the hollow internal flow channel of the fluid coupler 41 with the plumbing hole 39. Attachment of the flanged end 43 may be effected by conventional means, such as by fasteners that penetrate the flanged end 43 and mounting plate 31, or by using threaded hardware placed on the opposite (bottom) side of the nozzle mount 30 that clamps the flanged end 43 against the top surface of the mounting plate 31. A gasket or rubber seal may be placed between the flanged end 43 and the mounting plate 31 to ensure a good seal. In alternative embodiments, the fluid coupler 41 may be configured with male threads instead of the flanged end 43. In this alternative embodiment, the plumbing hole may be configured with corresponding female threads such that the fluid coupler can be threaded into the plumbing hole.

Figure 5:
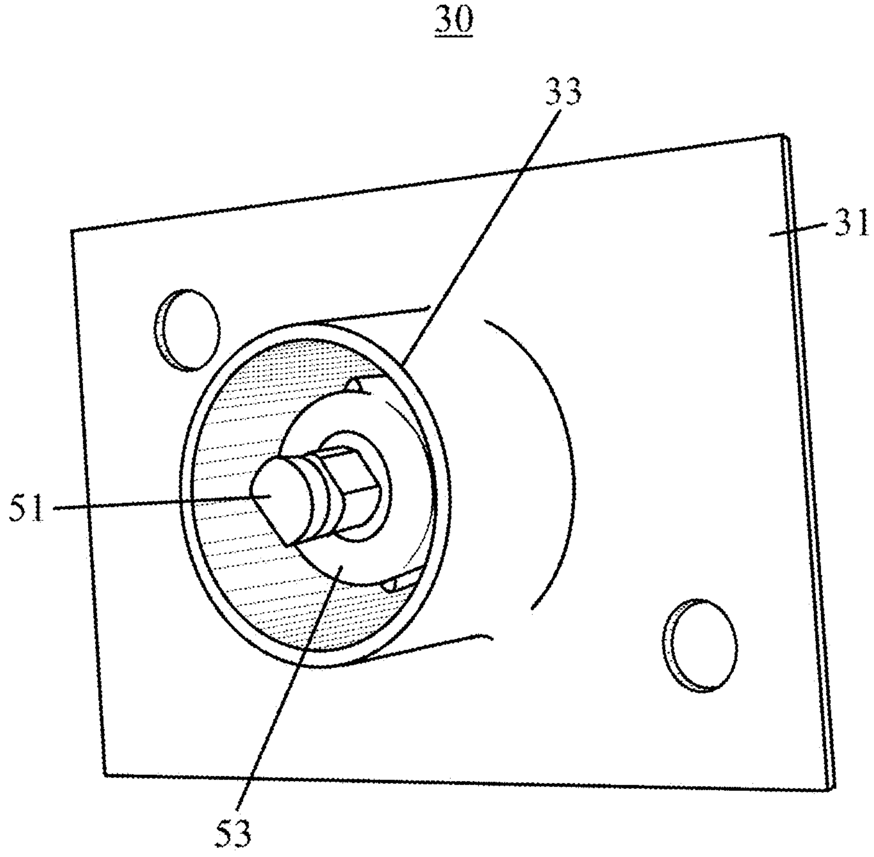
FIG. 5 is a bottom perspective view of the nozzle mount of FIG. 3, with a nozzle head installed thereon.

FIG. 5 shows a bottom perspective view of the nozzle mount of FIG. 3, with a nozzle head 51 installed thereon. A threaded nut 53, such as a hex head nut, may be attached to a complementary threaded end of tubing or conduit that extends from the flanged end of the fluid coupler 41 through the plumbing hole 39. In an embodiment of the fluid coupler and plumbing hole configured for threaded engagement therebetween, the fluid coupler may also be configured with internal threads configured for engagement with the threaded nut. Tightening of the threaded nut 53 secures the nozzle head 51 to lie entirely, or at least partially, within the nozzle shield 33. With respect to the lower surface of the mounting plate 31, if the maximum perpendicular displacement of the nozzle head 51 is equal to or less than the maximum perpendicular displacement of the nozzle shield 33, then the nozzle head 51 is understood to lie entirely within the nozzle shield 33. If the nozzle head 51 protrudes perpendicularly from the mounting plate 31 a greater distance than similar protrusion of the nozzle shield 33, then the nozzle head 51 is understood to lie at least partially within the nozzle shield 33. When the threaded nut 53 is loosened sufficiently, the nozzle head 51 is free to rotate, so that its direction of spray may be adjusted to a desired orientation. Once adjusted, the threaded nut 53 may be tightened again to maintain the nozzle head 51 in the desired orientation.

Figure 6:
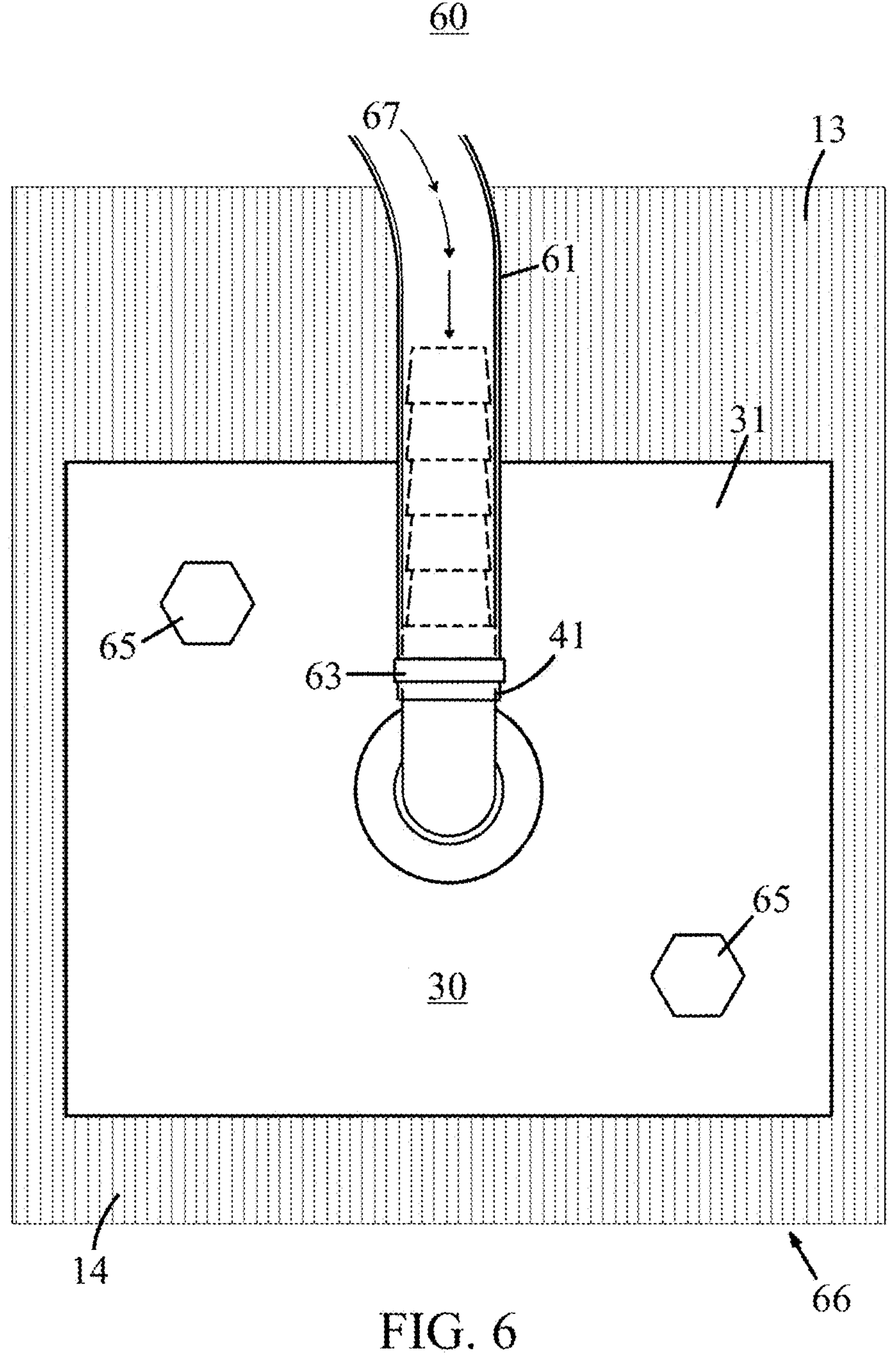
FIG. 6 is a top, partially transparent view of one embodiment of a nozzle mount as installed atop a specialized swather header according to the present invention.

FIG. 6 shows a top, partially transparent view of one embodiment of a nozzle mount 30 as installed atop a specialized swather header 60, with a fluid coupler 41 and hose 61 attached to the nozzle mount 30. The nozzle mount 30 is preferably installed proximate a forward end 14 of the hood 13. The installation of these and other components converts a conventional swather header 10 into the swather header 60 that is specialized according to one embodiment of the present invention. For example, in one embodiment, a specialized swather header 60 may include the hood 13, nozzle mount 30, hose barb 41, hose 61, hose clamp 63, and fastening hardware 65, as well as other components of the nozzle mount 30 that are hidden from this view, such as the nozzle shield 33, nozzle head 51, and threaded nut 53. In addition, arrow 67 indicates the direction of fluid flow from a fluid source (not shown) that may also form a part of the swather header 60. The fluid source may include a tank and pump, and fittings that maintain the tank, pump, and hose 61 in fluid communication. In one embodiment, the tank contains a volume of preservative such as such as a bacterial inoculant or a propionic acid-based solution, for application to hay or another grain crop that is cut and conditioned by the swather header 60. Preferably, such a tank is mounted locally on the swather header or on a tractor to which the swather header is attached.

The nozzle mount 30 may be mounted proximate the forward end 14 on the top surface of the hood 13 near a leading edge 66 of the hood 13. It may be necessary to modify the hood 13, as provided by the manufacturer, by drilling a nozzle mount installation hole 73 vertically through the hood 13 to allow passage of the nozzle shield 33 therethrough. In another embodiment, not shown, the nozzle mount 30 may be installed on the leading edge of the hood 13, so that the nozzle shield 33 extends beyond the leading edge and below the lower surface of the hood 13. The latter embodiment does not require the nozzle mount installation hole 73. In the latter embodiment, the nozzle shield 33 may be located off-center with respect to the mounting plate 31, and the off-center portion of the mounting plate 31 may also extend beyond the leading edge of the hood 13. In any embodiment disclosed herein, the nozzle mount 30 may be mounted to the hood 13 in such a way to allow a nozzle head 51 to lie at least partially within the nozzle shield 33 to be shielded from impact damage, while allowing the nozzle head 51 to be oriented to direct the spray of fluid carried by the hose 61 backward toward cut crop being processed by the conditioner 20. According to the invention, the nozzle head 51 is located forward of the conditioner, or is otherwise configured to douse with liquid preservative a crop cut by the blades 15 prior to the cut crop being pulled into or processed by the conditioner 20. Therefore, a nozzle mount of the present invention is defined herein as a preconditioner nozzle mount, and a specialized swather header of the present invention affixed with such a nozzle mount is referred to herein as a specialized swather header or a swather header with preconditioner nozzle mount.

Figure 7:
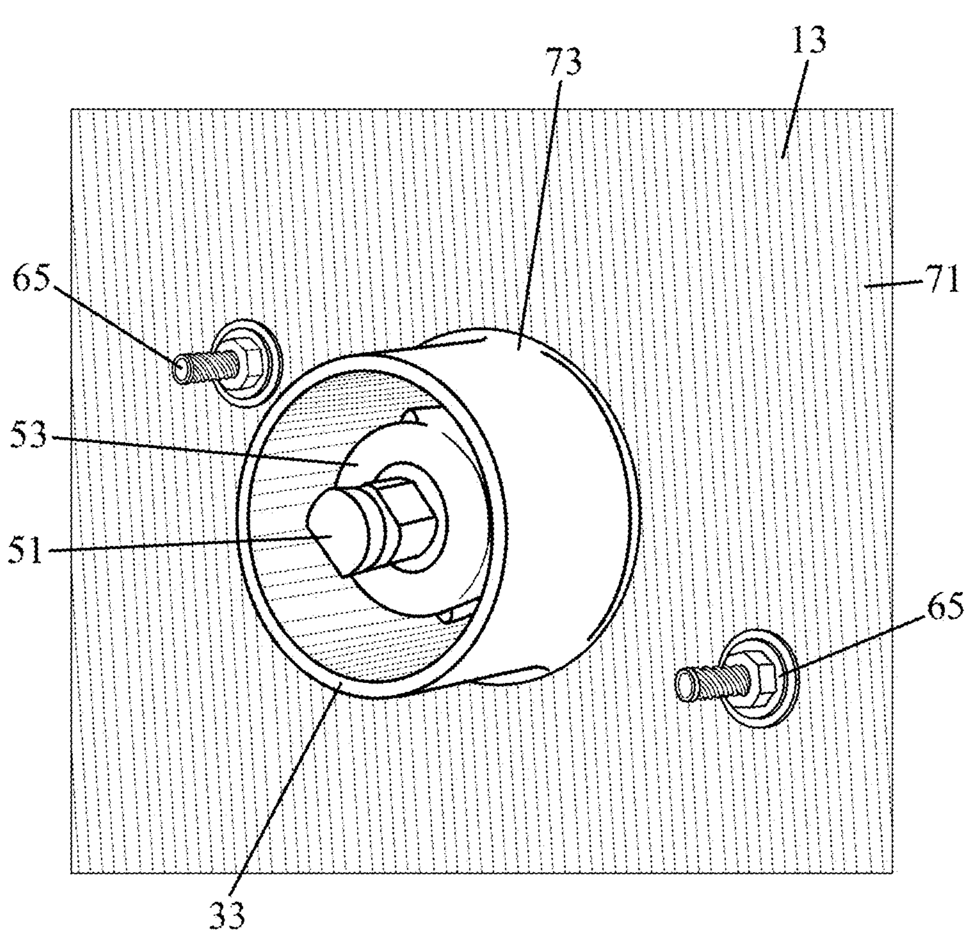
FIG. 7 is a bottom perspective view of the nozzle mount of FIG. 3, with a nozzle head attached, as installed on a swather header according to one embodiment of the present invention.

FIG. 7 shows a magnified bottom perspective view of a rectangular area of the specialized swather header 60, in the vicinity of a nozzle mount 30 mounted thereto. The nozzle shield 33 protrudes through the lower surface 71 of the hood 13 via the nozzle mount installation hole 73 in a direction that is substantially downward or substantially perpendicular to the lower surface 71. Nozzle head 51 is shown mounted at least partially within the nozzle shield 33. Fastening hardware 65 runs through the mounting holes 35 and secures the mounting plate 31 to the hood 13 by compressive force of threaded nuts and flat washers.

Figure 8:
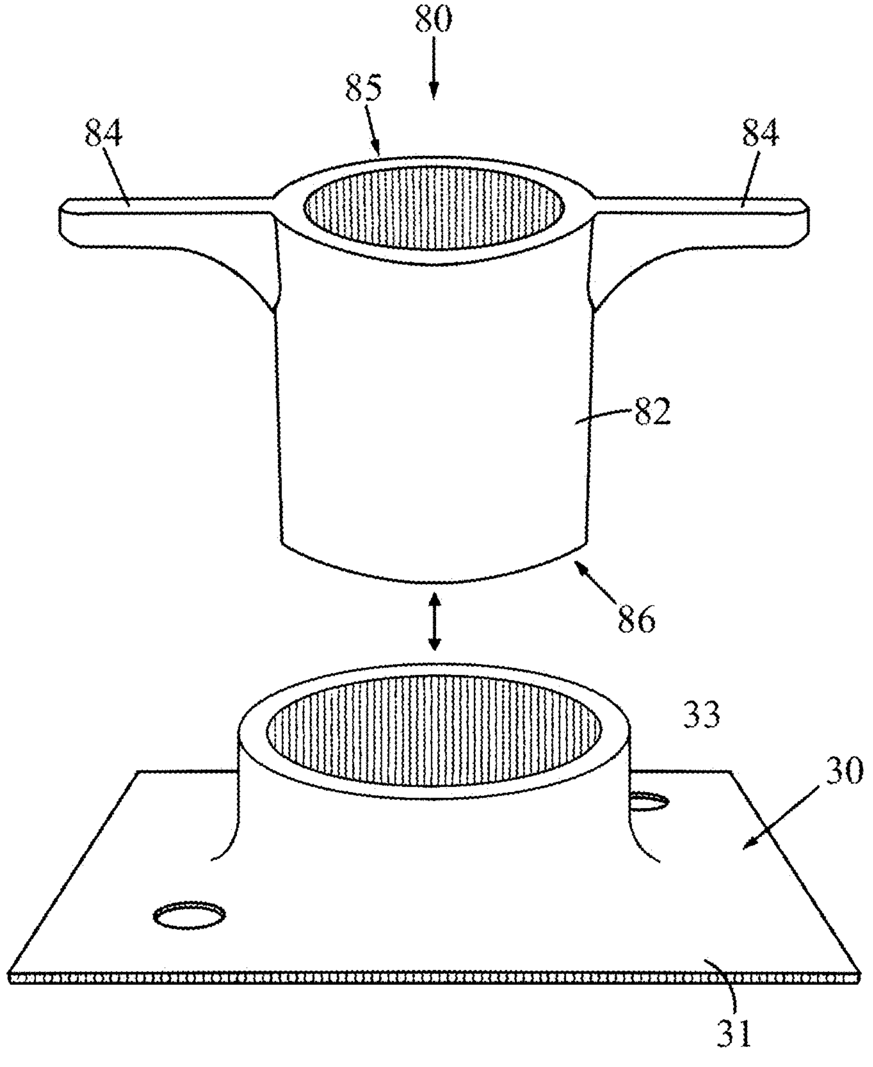
FIG. 8 is a perspective view of an installation tool for a nozzle mount according to one embodiment of the present invention.

FIG. 8 shows a side view of an installation tool 80 for a nozzle mount 30 according to one embodiment of the present invention. Installation tool 80 includes a socket 82 and one or more wings 84. The socket 82 has a hollow interior and may be generally cylindrical in form, and when cylindrical may have a diameter and a central axis running longitudinally therethrough. The tool 80 has a driving end 85 at one end of the socket 82, and an engagement end 86 at the opposite end of the socket 82. The engagement end 86 is configured to fit within the nozzle shield 33 and the plumbing hole 39 to allow for the tool 80 to engage the internal components of the nozzle mount 30, such as the nozzle head and/or threaded nut depending on the embodiment. Each wing 84 extends outwardly from the driving end 85 of the tool 80, in a direction substantially perpendicular with respect to the longitudinal axis, to allow a user to grasp and rotate the tool. In one example, the socket 82 may be formed by modifying a conventional drive socket, such as those found in a socket and ratchet set. Such modification may include removal of a portion of the proximal end of the conventional socket, so that the inner diameter of the tool 80 at the driving end 85 is circular and provides unobstructed access to the tool interior. The modification may further include welding each wing 84 to the driving end 85. Each wing 84 may be made from a metal rod or bar stock. Other embodiments are possible in which the tool 80 is formed from a non-metal such as a thermoplastic. Or, in one embodiment, the installation tool 80 may be originally formed as a singular piece, for example by casting or injection molding. In another embodiment, the engagement end 86 of the tool 80 may be formed to rotationally engage the outer circumference of a pipe fitting installed within the protective shield 33. For example, the pipe fitting may be the threaded nut 53, and the engagement end of tool 80 may be formed to engage a hexagonal nut.

The installation tool 80 operates similarly as a drive socket, e.g., to tighten or loosen the threaded nut 53. Tool 80, however, advantageously allows the user to quickly make minor clockwise or counterclockwise adjustments by hand to the tightness of the threaded nut 53 when adjusting the direction of spray of the nozzle head 51, rather than suffer the inconvenience of having to reset the rotational direction of the ratchet multiple times when fine-tuning the preconditioner orientation of the nozzle head 51.

Figure 9:
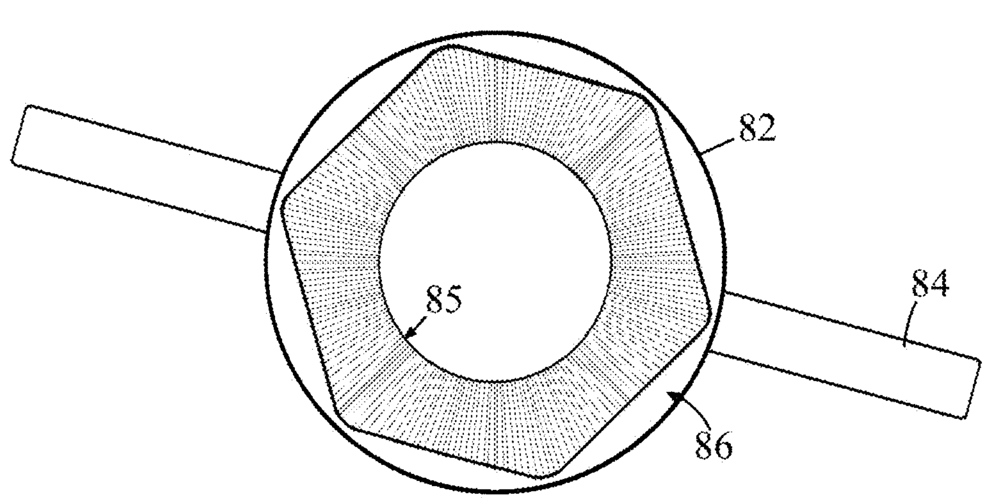
FIG. 9 is a bottom view of the installation tool of FIG. 8.

FIG. 9 shows a bottom view of the installation tool 80. In this view the engagement end 86 of the tool 80 is nearest to the viewer. This embodiment shows the engagement end 86 having a hexagonally shaped inner wall, and the driving end 85 having a circular cross-section to provide unobstructed access to the tool interior.

Figure 10:
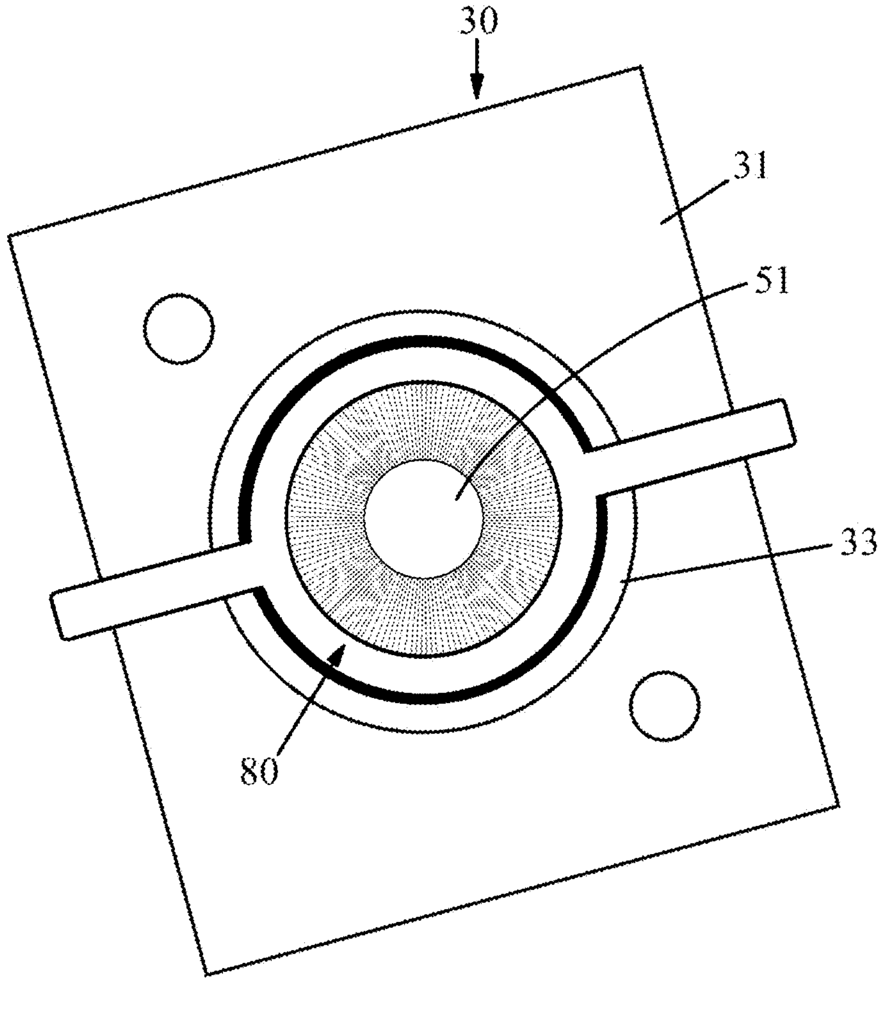
FIG. 10 is a top view of the installation tool of FIG. 8 mechanically engaged to a pipe fitting placed within a protective shield of a nozzle mount of the present invention.

FIG. 10 shows a top view of an installation tool 80 mechanically engaged to a pipe fitting, such as nozzle head 51. In operation, the pipe fitting is placed for impact protection within a nozzle shield 33 of a nozzle mount 30 of the present invention. In this example, the nozzle head 51 appears at the center of the figure and protrudes toward the viewer. The tool 80 is passed into the nozzle shield 33, so that it surrounds the nozzle head 51 and engages a fastening part of the pipe fitting, e.g., the threaded nut 53 (not visible in the figure). With tool 80 so engaged, a user can easily tighten or loosen the fastening part by hand, by grasping the wings 84 and rotating the tool 80 clockwise or counterclockwise.

Figure 11:
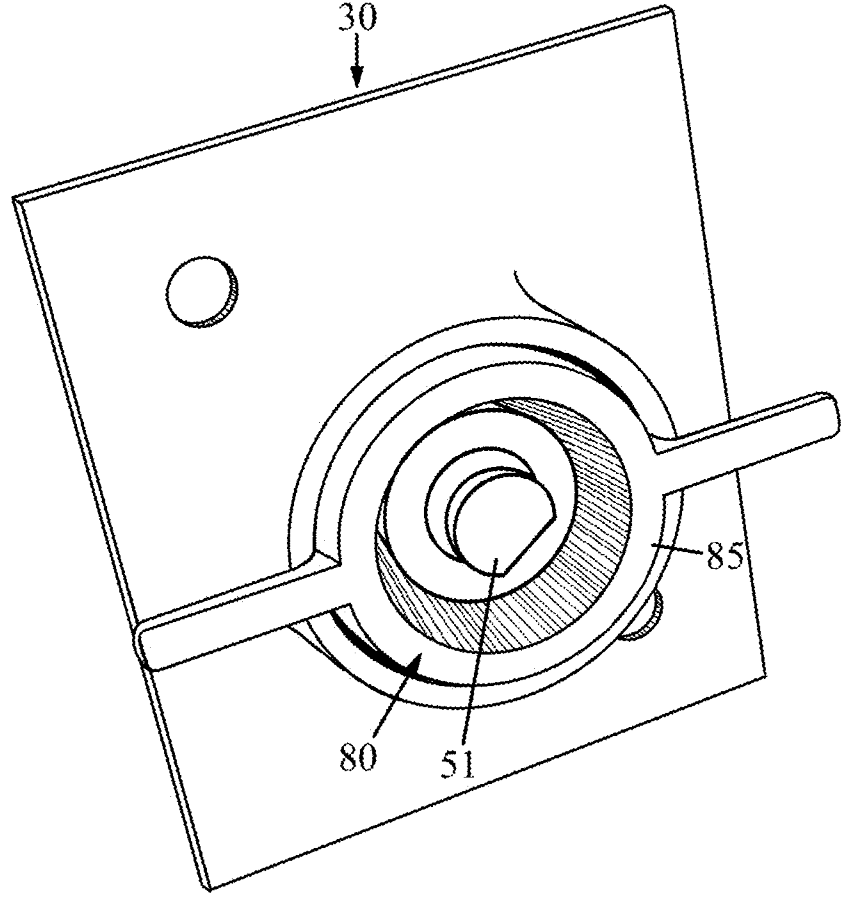
FIG. 11 is a perspective view the installation tool of FIG. 8 mechanically engaged to a pipe fitting placed within a protective shield of a nozzle mount of the present invention.

FIG. 11 is a perspective view of the installation tool 80 in a state of use. The tool 80 can be gripped by one hand of a user to adjust the tightness of a pipe fitting that is placed within the protective nozzle shield 33 of a nozzle mount 30 of the present invention.

Figure 12:
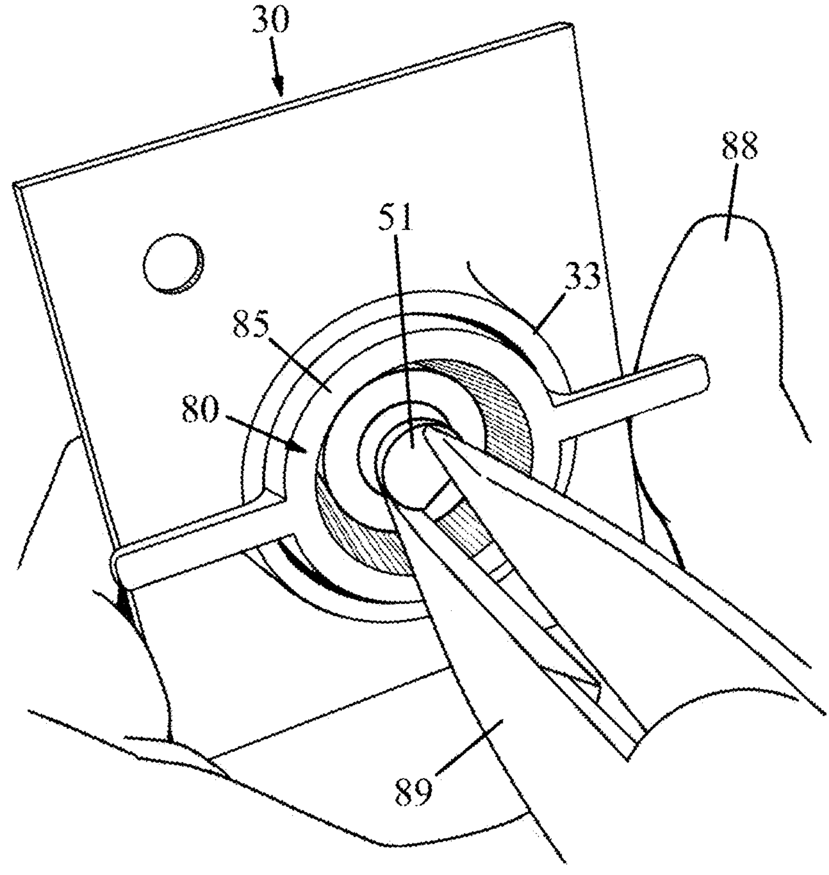
FIG. 12 is another perspective view of the installation tool of FIG. 8 in a state of use being gripped by one hand of a user to stabilize a pipe fitting placed within a protective shield of a nozzle mount of the present invention while the user adjusts the position of a nozzle head using pliers held by another hand of the user.

FIG. 12 is another perspective view of the installation tool 80 in a state of use. The tool 80 is being gripped by one hand 88 of a user to stabilize a pipe fitting that is placed within the protective nozzle shield 33 of a nozzle mount 30 of the present invention. At the same time, the user with his other hand grips a pair of pliers 89 that are inserted into through the driving end 85 of the tool 80. The unobstructed access at the driving end 85 allows the pliers to grip the nozzle head 51 and adjust its direction of spray. The invention thereby allows a user to temporarily loosen the pipe fitting to allow for directional adjustment of spray from the nozzle head, and when the nozzle head is accordingly adjusted to a desired orientation, the user may then manually tighten the pipe fitting while maintaining the nozzle head in the desired orientation by means of the pliers.

In another embodiment of the invention disclosed herein, a kit is provided for converting a conventional swather header into a modified swather header 10. The kit includes a nozzle mount 30 as shown and described herein, and an installation tool 80 as shown and described herein. A kit according to the invention may also include one or both of a fluid coupler 41 and a nozzle head 51 as shown and described herein. Another embodiment of a kit according to the invention includes a nozzle mount 30 and one or more of a fluid coupler 41, a hose 61, a hose clamp 63, fastening hardware 65, a nozzle shield 33, a nozzle head 51, a threaded nut 53, and an installation tool 80, as each of those components are shown and described herein.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A nozzle mount for a swather, comprising:

a mounting plate configured for attachment to a swather, the mounting plate attachable to a planar surface of the swather;

a nozzle extending from a first side of the mounting plate, and a nozzle shield extending from the first side and at least partially enclosing the nozzle, wherein the nozzle is configured to direct fluid flow into a swather;

a fluid coupler configured for attachment to a fluid source and extending from a second side of the mounting plate, wherein the fluid coupler is in fluid communication with the nozzle; and a threaded nut extending through the mounting plate and connected to the nozzle within the nozzle shield, wherein the threaded nut is configured to extend through the planar surface.

2. The nozzle mount of claim 1, wherein the fluid coupler comprises a flanged end with means to sealingly engage the mounting plate.

3. The nozzle mount of claim 2, wherein the fluid coupler further comprises barbed end extending away from the mounting plate opposite the flanged end, wherein the barbed end is configured for attachment to an external fluid source.

4. The nozzle mount of claim 1, wherein the nozzle shield is an integral extension of the mounting plate.

5. The nozzle mount of claim 1, wherein the mounting plate comprises a plurality of mounting holes configured to attach the mounting plate to a swather and a plumbing hole configured to align the fluid coupler with the nozzle shield through the mounting plate.

6. The nozzle mount of claim 5, wherein the plumbing hole is defined substantially in the center of the mounting plate.

7. The nozzle mount of claim 1, wherein the nozzle shield is configured to protect the nozzle from impact damage during use.

8. The nozzle mount of claim 1, wherein the mounting plate is configured to mount to a hood of a swather.

9. The nozzle mount of claim 1, wherein the nozzle, the nozzle shield and the fluid coupler are positioned substantially at a center of the mounting plate.

10. The nozzle mount of claim 1, wherein the nozzle, the nozzle shield and the fluid coupler are positioned substantially at a forward end of the mounting plate.

11. The nozzle mount of claim 10, wherein the mounting plate is configured to mount to a leading edge of a hood of the swather.

12. The nozzle mount of claim 11, wherein the nozzle extends past the leading edge of the hood of the swather.

13. A swather header having a hood, cutting blades mounted on a bottom side of the hood, a conditioner having a crop receiving end mounted behind the cutting blades, and a coupler operationally coupling the swather header to mechanical power for driving the cutting blades and the conditioner, the swather header comprising:

a preconditioner nozzle mount plate attached to the hood configured to direct a spray of fluid toward the receiving end of the conditioner, the preconditioner nozzle mount plate comprising:

a fluid coupler extending from a top side of the hood and configured for attachment to a fluid source;

a nozzle in fluid communication with the fluid coupler, wherein the nozzle extends through the hood to the bottom side; and a nozzle shield on the bottom side of the hood at least partially enclosing the nozzle, wherein the fluid coupler has a threaded nut extending through the hood and connected to the nozzle within the nozzle shield.

14. The swather header of claim 13, wherein the fluid coupler is an integral extension of the top side of the hood.

15. The swather header of claim 13, wherein the nozzle shield is an integral extension of the bottom side of the hood.

16. The swather header of claim 13, wherein the preconditioner nozzle mount is positioned at a leading edge of the hood.

17. The swather header of claim 13, wherein the threaded nut is configured to allow for the adjustment of the nozzle spray direction.

18. The swather header of claim 13, wherein the hood further comprises a fluid tank mounted thereon, wherein the fluid tank is in fluid communication with the fluid coupler.

* * * * *